United States Patent

[11] 3,624,019

| [72] | Inventors | Donald R. Anderson<br>Oswego;<br>Alvin J. Frisque, La Grange, both of Ill. |
|---|---|---|
| [21] | Appl. No. | 92,031 |
| [22] | Filed | Dec. 15, 1970 |
| [45] | Patented | Nov. 30, 1971 |
| [73] | Assignee | Nalco Chemical Company<br>Chicago, Ill. |

[54] PROCESS FOR RAPIDLY DISSOLVING WATER-SOLUBLE POLYMERS
6 Claims, No Drawings

[52] U.S. Cl. .................................................. 260/29.6 H,
260/29.6 B, 260/29.6 SQ, 260/29.6 HN
[51] Int. Cl. ........................................................ C08f 47/16,
C08f 47/18
[50] Field of Search .......................................... 260/29.6 H

[56] References Cited

UNITED STATES PATENTS

| 2,751,368 | 6/1956 | Yost et al. | 260/41 |
|---|---|---|---|
| 3,282,874 | 11/1966 | Friedrich et al. | 260/29.2 |
| 3,350,338 | 10/1967 | Savage | 260/29.6 |
| 3,402,137 | 9/1968 | Fischer et al. | 260/29.6 |
| 3,412,060 | 11/1968 | Sarem | 260/29.6 |

OTHER REFERENCES

Davidson et al., Water Soluble Resins, Reinhold, New York 1968 pages 176– 177 & 197

*Primary Examiner*—Melvin Goldstein
*Attorneys*—John G. Premo, Charles W. Connors, Edward A. Ptacek and John S. Roberts, Jr.

ABSTRACT: Water-soluble vinyl addition polymers and gums may be rapidly dissolved in water by first dispersing these polymers into a water-in-oil emulsion and then inverting these emulsions in water. The inversion of the emulsion releases the polymer into water as a solution.

PROCESS FOR RAPIDLY DISSOLVING WATER-SOLUBLE POLYMERS

Various synthetic and naturally occurring water-soluble polymers have been developed which exhibit, in aqueous solution, superior thickening and flocculating properties. These polymers are being used increasingly in a number of commercial applications such as, for example, in the clarification of aqueous solutions, in papermaking operations, in the treatment of sewage and industrial wastes, as stabilizers for drilling muds, and in the secondary recovery of petroleum by waterflooding.

Although these polymers are most often available commercially as powders or as a finely divided solid, they are most frequently utilized as aqueous solutions. This necessitates that the solid polymer material be dissolved in water. Although the various polymers are more or less soluble in water, difficulty is often experienced in preparing aqueous polymer solutions because of their slow dissolution and because the solid polymer is not readily dispersible in water. Furthermore, dispersion of solid polymers in water is hindered by their tendency to clump or remain as agglomerates on contact with water. Lumps of solid polymer immediately form by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution.

THE INVENTION

This invention is directed to the discovery that water-soluble vinyl addition polymers and gums may be rapidly dissolved or dispersed in water which comprises the steps of:

A. first preparing a water-in-oil emulsion which contains dispersed therein finely divided particles of the water-soluble vinyl addition polymer or gum. This produces what may be termed as polymer-containing emulsion;

B. the polymer-containing emulsion is then inverted in water whereby the water-soluble vinyl addition polymer or gum is released into the water as a solution.

THE WATER-SOLUBLE VINYL ADDITION POLYMERS

These polymers are well known to the art and have been described in numerous publications and patents. The polymers most commonly used in many industrial applications are acrylamide polymers which include polyacrylamide and its water-soluble copolymeric derivatives such as, for instance, acrylamide-acrylic acid, and acrylamide-acrylic acid salt copolymers which contain from about 95—5 percent by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5 percent by weight of acrylamide.

Other water-soluble vinyl polymers are described in detail in the following U.S. Pat. Nos. 3,418,237, 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethylmethacrylate are cationic. Polymers such as polyvinyl alcohol are nonionic, and polymers such as polyacrylic acid or polystyrene sulfonates are anionic. All of these polymers may be used in the practice of the invention.

The molecular weight of the polymers described above may vary over a wide range, e.g: 10,000–25,000,000. The invention, however, finds its greatest usefulness in preparing aqueous solutions or dispersions of these polymers and, in particular, acrylamide polymers whose molecular weight are in excess of 1 million. Polymers having higher molecular weights are more difficultly dissolved in water and tend to form extremely viscous solutions at relatively low concentrations. Also, the polymers may be produced by any known methods of conducting polymerization reactions. Thus, solution suspension or emulsion polymerization techniques may be used. The gums are well-known water-soluble polymers and are described in Vol. 10 of the *Encyclopedia of Chemical Technology*, 2nd Edition, Interscience Publishers, 1966.

The invention is capable of producing rapidly aqueous solutions of the water-soluble vinyl addition polymers or gums having concentrations within the range of 0.1–20 percent by weight. The invention most often finds usefulness when it is desired to form aqueous solutions of polymers having a solution concentration of 0.2–2.0 percent by weight.

THE WATER-IN-OIL EMULSIONS

The water-in-oil emulsions may be prepared by any number of known techniques. The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil & Refining Company under the trade name ISOPAR M. Typical specifications of this narrow-cut isoparaffinic solvent are set forth below in table I:

TABLE I

| Specification properties | Minimum | Maximum | Test method |
|---|---|---|---|
| Gravity, API at 60/60° F | 48.0 | 51.0 | ASTM D 287 |
| Color, Saybolt | 30 | | ASTM D 156 |
| Aniline point, ° F | 185 | | ASTM D 611 |
| Sulfur, p.p.m | | 10 | ASTM D 1266 [1] |
| Distillation, ° F | | | ASTM D 86 |
| IBP | 400 | 410 | |
| Dry point | | 495 | |
| Flash point, ° F. (Pensky-Martens closed cup) | 160 | | ASTM D 93 |

[1] Nephelometric mod.

The amount of oil used in relation to the water to prepare the emulsion may be varied over wide ranges. As a general rule, the amount of oil-to-water may vary between 5:1—1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high-speed agitation or ultrasonic techniques. In most instances, however, it is desirable that the emulsion be a stable emulsion and to achieve the end it is often necessary to employ an oil-soluble emulsifying agent. The amount of emulsifying agent to provide an emulsion will have to be determined by routine experimentation. As a general rule it may be said that the amount of oil-soluble emulsifier may range from 0.1 to 30 percent by weight based on the weight of the oil. To produce stable emulsions the amount of emulsifier will normally be within the range of 12-20 percent by weight of the oil.

Rather than provide a listing of suitable emulsifiers, we prefer to generally recommend as being satisfactory the so-called low HLB materials which are well documented in the literature and are summarized in the Atlas HLB Surfactant Selector. Although these emulsifiers are useful in producing good wateroin-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

DISPERSING THE POLYMERS INTO THE WATER-IN-OIL EMULSIONS

In accordance with the first step or procedure of the invention, the water-soluble vinyl addition polymers or the gums are dispersed into the water-in-oil emulsion. The polymers as produced by most manufacturing processes are in the form of powders or lumplike agglomerates of varying particle size. It is desirable that the particles, before being placed into the emulsion, be comminuted by grinding, abrading or the like so that their average particle size is less than 5 millimeters and preferably is within the range of 1-5 microns. After the powders have been comminuted, they may be dispersed into the water-in-oil emulsion by means of agitation provided by such devices as stirrers, shakers and the like. To be commercially practical, the amount of polymer in the emulsion should be at least 2 percent by weight. The invention contemplates using emulsions containing between 5-75 percent by weight with preferred emulsions having a polymer concentration within the range of 10-45 percent by weight. In some cases the starting emulsions are converted to suspensions due to the nature and the amount of the polymer present therein.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble vinyl addition polymers directly from the vinyl monomers from which these polymers are synthesized. Such polymer-containing emulsion may be synthesized by using the water-in-oil emulsion polymerization technique set forth in U.S. Pat. No. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices. The polymeric latices produced by this patent are relatively unstable and frequently must be treated with additional emulsifiers to render the products stable.

INVERTING THE EMULSION

The major discovery upon which this invention is predicated resides in the discovery that when the polymer-containing emulsions of the type described are inverted in the presence of water, that the polymer rapidly goes into solution. The polymer-containing emulsions release the polymer in the water in a very short period of time when compared to the amount of time required to dissolve a solid form of the polymer.

The polymer-containing emulsions may be inverted by any number of means. The most convenient means resides in the use of a surfactant added to either the polymer-containing emulsion or to the water into which it is to be dissolved. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on polymer. Good inversion often occurs within the range of 1.0-10 percent based on polymer.

THE SURFACTANTS

The preferred surfactants are hydrophylic and are further characterized as being water-soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as the surfactant. Examples of suitable anionic surfactants are alkali metal, ammonium and amine soaps; the fatty acid part of such soaps contains preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Examples of suitable cationic surfactants are salts of long-chain primary, secondary, or tertiary amines, such as oleylamine acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants are condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amides with five, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitolanhydride, called Mannitan, and sorbitol-anhydride, called Sorbitan), such as the emulsion even reacted they 10 molecules of ethylene oxide, pentaerythritolmonooleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether) A combination of two or more of these surfactants may be used; e.g. a cationic may be blended with a nonionic or an anionic with a nonionic.

Following is a list of suitable surfactants that could be used in the practice of this invention. Any water-soluble surfactant could be used, but naturally some are more efficient than others Useful surfactants include, but are not limited to: polyoxyethylene alkyl phenol, polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecylether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

Other techniques for inverting the emulsions include the use of agitation, high voltage electrical fields, heat and pH shift, as well as the placement into the water, into which the polymer-containing emulsion is to be dissolved, certain electrolytes. For any particular polymer-containing emulsion a suitable method for its inversion may be readily determined by routine experimentation.

EXAMPLES

To illustrate the invention the following presented examples are set forth below in table II. A variety of emulsions were prepared containing different water-soluble vinyl addition polymers. The emulsions were then inverted using different techniques. Inversion method No. 1 was the placement of a surfactant into the water to which the polymer was to be dissolved. Inversion method No. 2 incorporated the surfactant into the emulsion. Inversion method No. 3 was agitation without the presence of surfactant.

We claim:

1. A method of rapidly dissolving an acrylamide polymer into water, which comprises the steps of:
   A. preparing a water-in-oil emulsion which contains dispersed therein a finely divided acrylamide polymer; thereby providing an acrylamide polymer containing emulsion; and then,
   B. inverting said emulsion in water which contains a water-soluble surfactant whereby the acrylamide polymer is released into the water as a solution.

2. A method of rapidly dissolving an acrylamide polymer into water, which comprises the steps of:
   A. preparing a water-in-oil emulsion which contains dispersed therein finely-divided an acrylamide polymer and a compatible water-soluble surfactant; thereby providing an acrylamide polymer containing emulsion; and then,
   B. inverting said emulsion by adding it to water whereby the acrylamide polymer is released into the water as a solution.

3. A method of rapidly dissolving an acrylamide polymer into water, which comprises the steps of:
   A. preparing a water-in-oil emulsion having an oil to water ratio between 5:1 — 1:10 which contains dispersed therein from 51–75 percent by weight of particles ranging in size from 5 millimicrons to 5 millimeters of an acrylamide polymer; and then,
   B. inverting said acrylamide polymer containing emulsion by adding it in an amount to provide from 0.1–20 percent by weight of the acrylamide polymer to water which contains from 1.0–10 percent by weight based on the weight of the acrylamide polymer of a water-soluble surfactant whereby the acrylamide polymer is released into the water as a solution.

4. A method of rapidly dissolving an acrylamide polymer into water which comprises the steps of:
   A. preparing a water-in-oil emulsion having an oil to water ration between 5:1 — 1:10 which contains dispersed therein from 5 –75 percent by weight of particles ranging in size from 5 millimicrons to 5 millimeters of an acrylamide polymer and from 1.0–10 percent by weight of the acrylamide polymer of a compatible water-soluble surfactant; and then,
   B. inverting said acrylamide polymer containing emulsion by adding it in an amount to provide from 0.1–20 percent by weight of the acrylamide polymer to water whereby the acrylamide polymer is released into the water as a solution.

5. A method of rapidly dissolving an acrylamide polymer into water which comprises the steps of:
   A. preparing a water-in-oil emulsion which contains dispersed therein from 5 –75 percent by weight of particles ranging in size from 5 millimicrons to 5 microns of an acrylamide polymer and from 1.0–10 percent by weight of the acrylamide polymer of a compatible water-soluble surfactant; and then,
   B. inverting said acrylamide polymer containing emulsion

TABLE II

| Water (percent by weight) | Oil (percent by weight) | Polymer | Percent in emulsion | Polymer particle size range | Inversion method | Dissolution time |
|---|---|---|---|---|---|---|
| 72 | 28 (I) | 93% acrylamide, 7% methacrylic acid | 35 | 5–70 microns | ² 2 | <5 min. |
| 72 | 28 (I) | do | 35 | do | ³ 3 | 30–45 min. |
| 72 | 28 (T) | 70% acrylamide, 30% acrylic acid | 35 | do | ¹ 2 | <5 min. |
| 72 | 28 (T) | Acrylamide | 35 | do | ¹ 2 | <5 min. |
| 67 | 33 (I) | 93% acrylamide, 7% methacrylic acid | 32 | <30 microns | ² 1 | 5–10 min. |
| 67 | 33 (I) | 75% acrylamide, 25% DMAEM | 30 | do | ² 1 | 5–10 min. |
| 67 | 33 (T) | Acrylamide | 35 | 10 microns–1 mm | ² 1 | 5–10 min. |
| 50 | 50 (I) | 70% acrylamide, 30% acrylic acid | 34 | do | ² 1 | Immediate. |
| 48 | 52 (I) | Sodium polyacrylate | 37 | <1 mm | ¹ 1 | <15 min. |
| 23 | 67 (I) | Acrylamide (dry solids into emulsion) | 23 | 10 microns–1 mm | ¹ 1 | <1 hour. |

¹ Octyl phenol Rx with 3 moles of EtO.
² Octyl phenol Rx with 10 moles of EtO.
³ Complex organic phosphate ester.

NOTE.- I = Isopar M; T = Toluene; DMAEM = Dimethyl aminoethyl methacrylate; 1 = Surfactant added to water; 2 = Surfactant added to Emulsion; 3 = Agitation without Surfactant.

by adding it in an amount to provide from 0.1–20 percent by weight of the acrylamide polymer to water whereby the acrylamide polymer is released into the water as a solution 6. A method of rapidly dissolving an acrylamide polymer into water which comprises the steps of:

A. preparing a water-in-oil emulsion which contains dispersed therein from 5–75 percent by weight of particles ranging in size from 5 millimicrons to 5 microns of an acrylamide polymer, and then B. inverting said acrylamide polymer containing emulsion by adding it in an amount to provide from 0.1–20 percent by weight of the acrylamide polymer to water which contains from 1.0–10 percent by weight based on the weight of the acrylamide polymer of a water-soluble surfactant whereby the acrylamide polymer is released into the water as a solution.

* * * * *

UNITED STATES PATENT OFFICE
CERTIFICATE OF CORRECTION

Patent No. 3,624,019            Dated November 30, 1971

Inventor(s) Donald R. Anderson and Alvin J. Frisque

It is certified that error appears in the above-identified patent and that said Letters Patent are hereby corrected as shown below:

Column 3, line 14, "wateroin-oil" should be -- water-in-oil --

Column 3, line 49, "emulsifiers" should be -- emulsion --

Column 4, line 17, "hydrophylic" should be --hydrophilic--

Column 4, line 46, "aminoethyl-aminoethyl stearamide" should be -- aminoethyl stearamide --

Column 4, line 55, "and" should be -- with --

Column 4, line 69, "such as the emulsion even reacted they" should be -- such as glycerol monopalmitate reacted with --

IN CLAIMS

Column 6, line 25, "51 - 75 percent" should be -- 5 - 75 percent --

Signed and sealed this 18th day of April 1972.

(SEAL)
Attest:

EDWARD M. FLETCHER, JR.
Attesting Officer

ROBERT GOTTSCHALK
Commissioner of Patents